United States Patent [19]

Ishii et al.

[11] Patent Number: 5,077,629

[45] Date of Patent: Dec. 31, 1991

[54] SWITCH WITH PRE-ALARMS MEANS

[75] Inventors: Kazuhiro Ishii; Kenzi Kimura, both of Fukuyama, Japan

[73] Assignee: Misubishi Denki Kabushiki Kaisha, Tokyo, Japan

[21] Appl. No.: 700,071

[22] Filed: May 3, 1991

Related U.S. Application Data

[63] Continuation of Ser. No. 372,820, Jun. 29, 1989, abandoned.

[30] Foreign Application Priority Data

Jul. 5, 1988 [JP] Japan ................. 63-165815

[51] Int. Cl.⁵ ............................................. H02H 3/93
[52] U.S. Cl. ........................................ 361/94; 361/97; 340/661
[58] Field of Search ................. 361/87, 94-97; 340/661, 662, 664

[56] References Cited

U.S. PATENT DOCUMENTS

| | | | |
|---|---|---|---|
| 3,775,675 | 11/1977 | Freeze et al. | 361/94 |
| 4,210,906 | 7/1980 | Smith et al. | 340/661 |
| 4,335,437 | 6/1982 | Wilson et al. | 364/483 |
| 4,414,601 | 11/1983 | Conroy | 361/94 |
| 4,860,153 | 8/1989 | Ishii | 361/94 |

FOREIGN PATENT DOCUMENTS 3501353 1/1985 Fed. Rep. of Germany .
2497013 12/1980 France .
2564648 5/1984 France .

OTHER PUBLICATIONS

European Search Report, dated Jun. 15, 1990.

*Primary Examiner*—6
*Assistant Examiner*—Todd E. Deboer
*Attorney, Agent, or Firm*—Burns, Doane, Swecker & Mathis

[57] ABSTRACT

In a switch with pre-alarm means (101) having pre-alarming apparatus (20, 21) and an indicator (103) for alarming that value of current flowing on a load is above a predetermined alarming level, output of the pre-alarming apparatus is held at a predetermined level after the value of the current once becomes above the alarming level by self-holding function of thyristor (CR) even when the value of the current becomes below the alarming level after that.

6 Claims, 6 Drawing Sheets

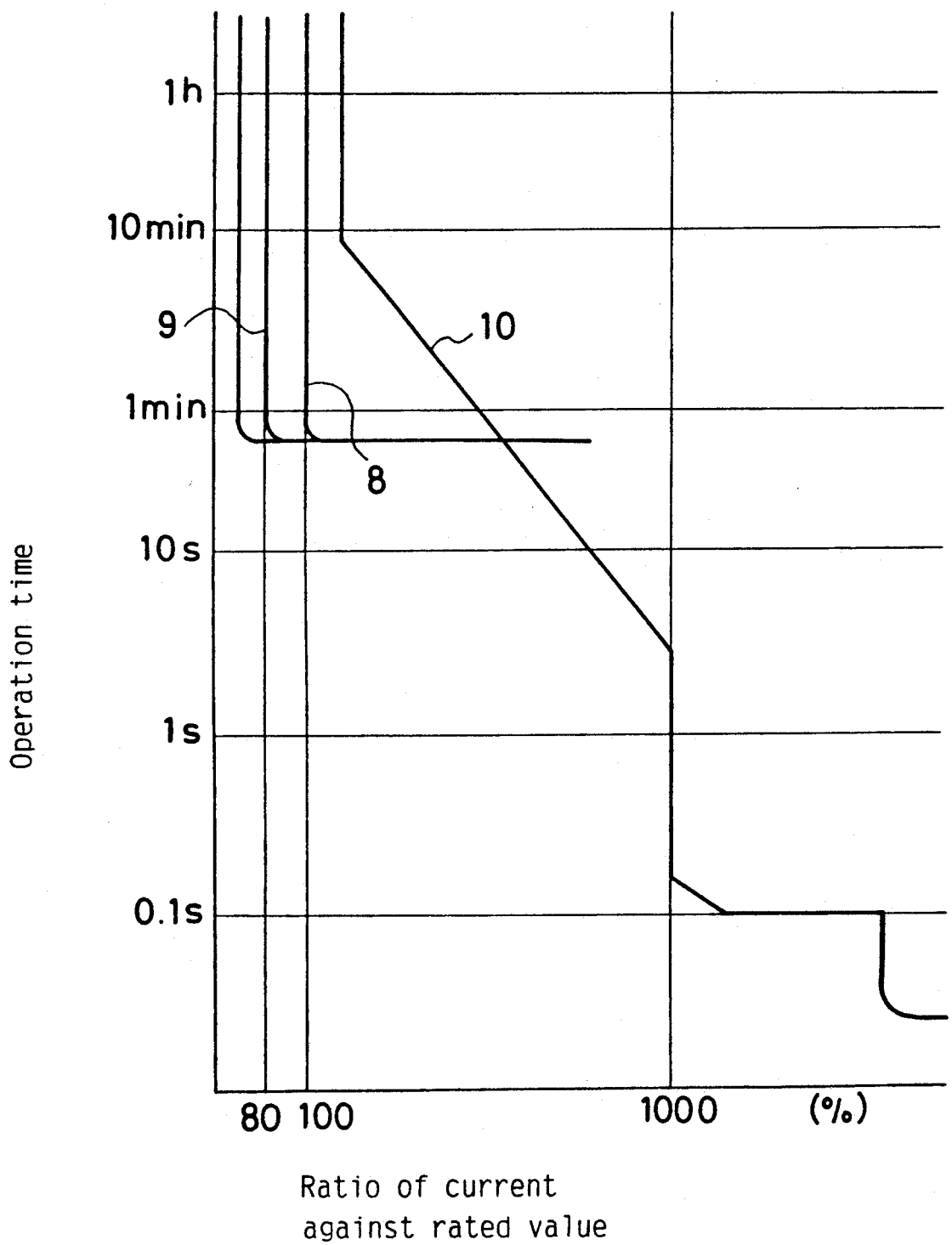

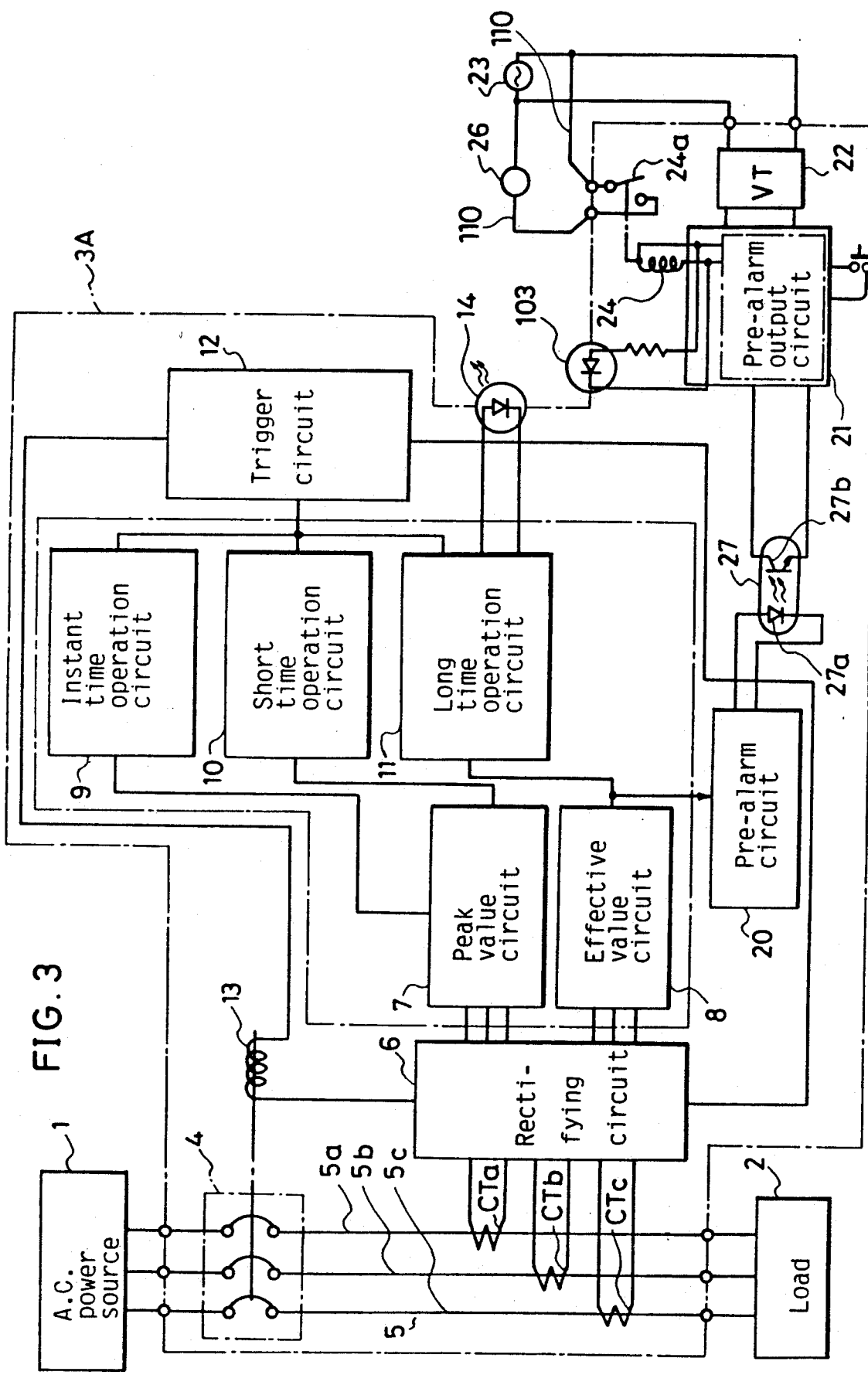

1

SWITCH WITH PRE-ALARMS MEANS

This application is a continuation of application Ser. No. 07/372,820, filed June 29, 1989 now abandoned.

BACKGROUND OF THE INVENTION

1. Field of the Invention

The present invention relates to a switch with pre-alarm means for alarming that abnormal current flows on breaker of the switch previous to tripping operation of the breaker, and especially relates to a switch with pre-alarm means having self-holding function for alarming that an abnormal current flew even when the abnormal current had disappeared.

2. Description of the Prior Art

Conventionally, a switch with pre-alarm means having an operation indicator and pre-alarm apparatus is known in the art. The operation indicator is, for example, a light emitted diode (LED) or a buzzer and provided on an outer face of a housing of the switch.

When accident happens on the load, abnormal over current flows on breaker of the switch. The pre-alarm apparatus detects the over current. When level of the over current is above a predetermined alarming level, the pre-alarm apparatus outputs a signal for lighting the LED or for driving the buzzer. Thereby, the user or operator confirms the occurrence of the over current by vision or hearing.

After lapse of a predetermined time period under occurrence of the over current, the breaker of the switch is tripped and the over current is cut off.

However, when the level of the abnormal over current once becomes below the predetermined alarming level, the LED puts off and the operator or user can not confirm the occurence of the over current. Therefore, the conventional switch with pre-alarm means has disadvantage that the operation indicator must be monitored all times.

SUMMARY OF THE INVENTION

Object of the present invention is to provide an improved switch with pre-alarm means having self-holding function for indicating the occurrence of over current without monitoring at all times.

A switch with pre-alarm means in accordance with the present invention comprises:

current value measuring means for measuring current values flowing on loads and outputting first signal corresponding to maximum of the current values;

pre-alarm judging means for comparing the first signal from the current value measuring means with a predetermined reference value and outputting second signal when the first signal is above the reference value;

self-holding means for holding an output thereof at a predetermined level when the second signal is once outputted from the pre-alarm judging means and even when any second signal is not output after that; and alarming means for alarming occurrence of abnormal over current by receiving the output of the self-holding means.

The switch with pre-alarm means in accordance with the present invention is constructed as mentioned above, when value of the current flowing on the load is above the predetermined reference level, the pre-alarm judging means acts on and the self-holding means holds the output thereof at a predetermined level. Therefore, the alarming means, for example, an LED or a buzzer continues to alarm the occurrence of the abnormal over current even when the value of the current becomes below the predetermined reference level. Thereby, operator or user can confirm that the value of the current at least once has been above the predetermined alarming level.

BRIEF DESCRIPTION OF THE DRAWINGS

FIG. 2 is a drawing for showing time-current characteristics of pre-alarm and over-current tripping operations of the switch with pre-alarm means in accordance with the present invention.

FIG. 3 is a circuit diagram of the switch with pre-alarm means in accordance with the present invention.

DESCRIPTION OF THE PREFERRED EMBODIMENTS

A preferred embodiment of a switch with pre-alarm means in accordance with the present invention is described referring to FIGS. 1, 2, 3, 4 and 5.

Figure 1:
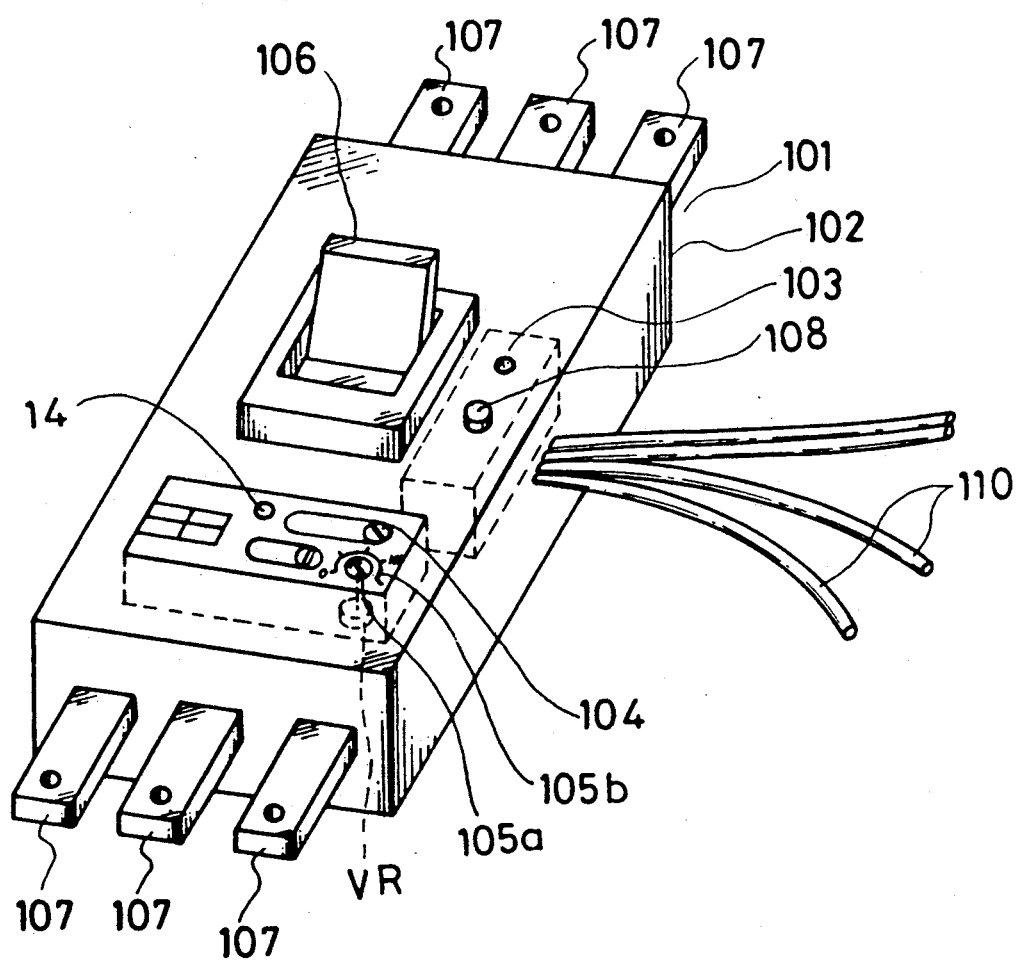
FIG. 1 is a perspective view for showing a preferred embodiment of a switch with pre-alarm means in accordance with the present invention.

FIG. 1 is a perspective view showing a switch with pre-alarm means in accordance with the present invention. In FIG. 1, the switch 101 comprises a breaker and a pre-alarm apparatus in a housing 102. An operation indicator 103 which is, for example, a light emitted diode (LED) is provided on outer face of the housing 102, thereby an operator can easily confirm the operation indicator 103. A reset switch 108 is also provided on the outer face of the housing 102. A lug 104 is for changing rated value of current of the switch 101, and lug 105a is for adjusting level of the pre-alarm of the switch. The lug 105a is rotatable and co-axially connected to a variable resistor such as $VR_1$ shown in FIG. 4, and thereby the level of the pre-alarm for lighting the operation indicator 103 is continuously adjusted in a predetermined range for example 70-100% of the rated value of the current of the switch 101. A level indicator 105b such as scale for current (A) is provided around the lug 105a, thereby the level of the pre-alarm can be confirmed.

Figure 1A:
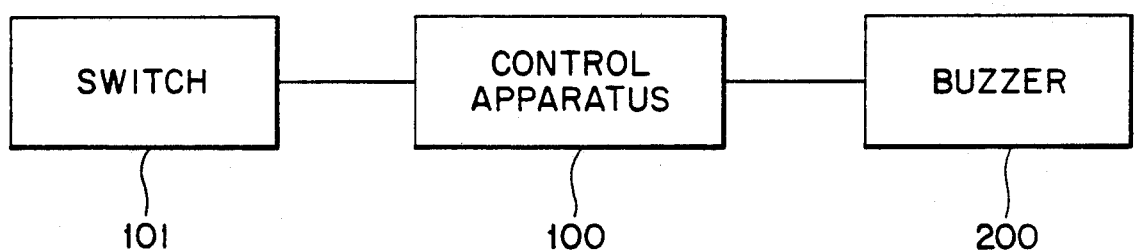
FIG. 1A is a diagram of a system incorporating the switch of FIG. 1.

Furthermore, numeral 106 designates an operation lever of the breaker installed in the housing 102 for making and breaking contacts thereof; and numerals 107, 107 ... designate terminals of the switch 101 to be connected to electric power lines and loads. Numeral 110 designates cables to be connected to another apparatus, for example, a centralized control apparatus 100, as is shown schematically in FIG. 1A.

FIG. 3 is a circuit diagram of the switch with pre-alarm means in accordance with the present invention. In FIG. 3, current transformers CTa, CTb and CTc are disposed on three phases of A.C. power lines 5a, 5b and 5c, respectively. Output of secondary windings of the current transformers CTa, CTb and CTc are inputted to a rectifying circuit 6. Outputs of the rectifying circuit 6 is inputted to a peak value circuit 7 and an effective value circuit 8. The peak value circuit 7 selects an output from the rectifying circuit 6 corresponding to an output of the current transformers CTa, CTb and CTc including maximum value and converting the output to a peak value. The effective value circuit 8 also selects an output from the rectifying circuit 6 including maximum value and converting the output to an effective value. Output of the peak value circuit 7 is inputted to an instant time operation circuit 9 and a short time operation circuit 10. Output of the effective value circuit 8 is inputted to a long time operation circuit 11 and a pre-alarm circuit 20.

The instant time operation circuit 9, the short time operation circuit 10 and the long time operation circuit 11 are connected to a trigger circuit 12, respectively. The trigger circuit 12 is connected to a tripping coil 13 and the rectifying circuit 6. The other terminal of the tripping coil 13 is also connected to the rectifying circuit 6. A light emitting diode (LED) 14 for indicating occurrence of over-current is connected to the long time operation circuit 11. The pre-alarm circuit 20 is connected to a pre-alarm output circuit 21 via photo-coupler 27. A light emitting diode (LED) 103 for pre-alarming and a relay coil 24 for pre-alarming are connected to the pre-alarm output circuit 21. An electric power source 23 for controlling the switch 101 is connected to the pre-alarm output circuit 21 via a voltage dropping element 22 such as a voltage transformer (VT). An alarm buzzer 26 is connected to the power source 23 via switch 24a. The switch 24a is opened and closed by operation of the relay coil 24 for pre-alarming, thereby the alarm buzzer 26 is controlled.

Figure 4:
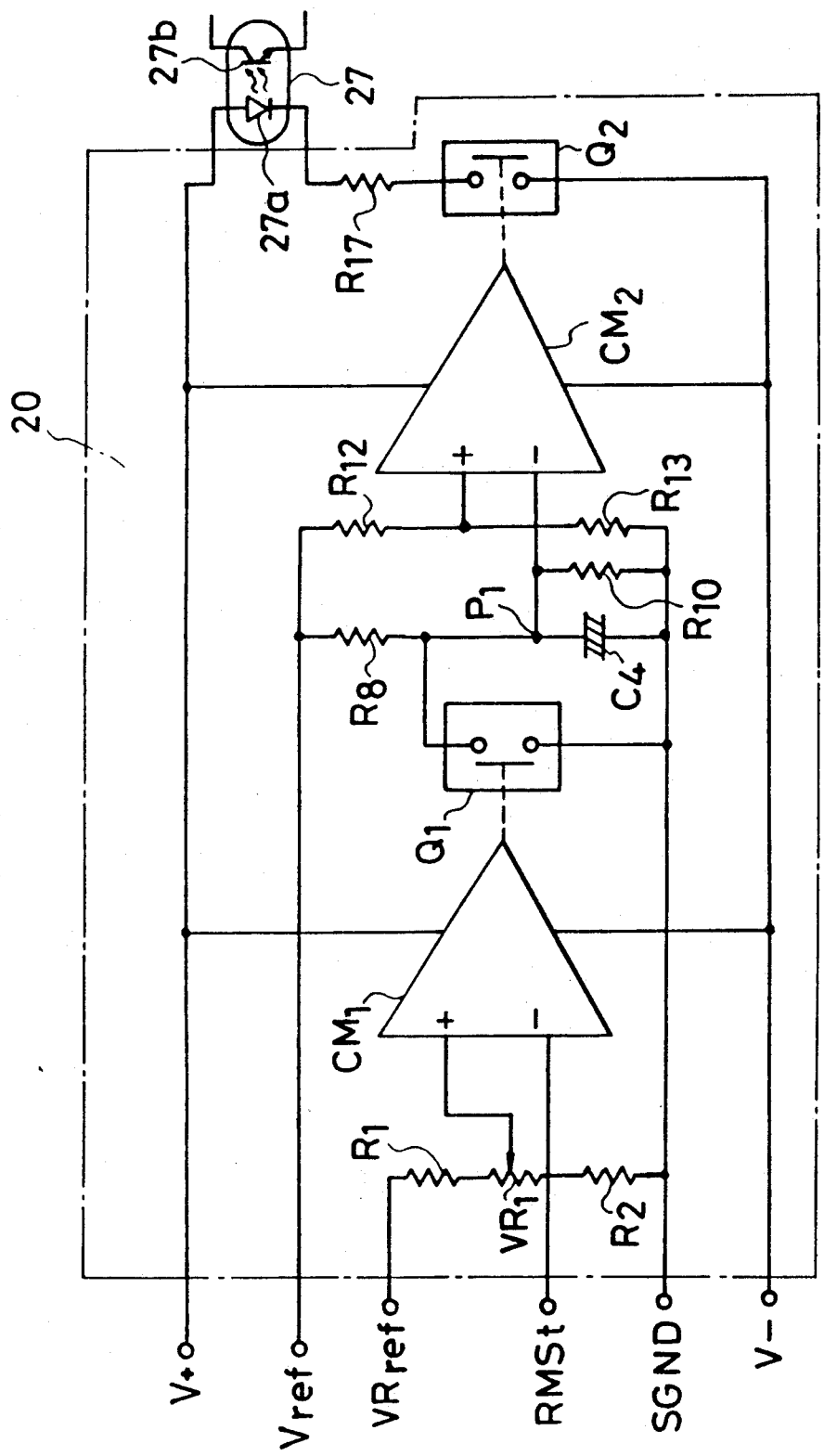
FIG. 4 is a circuit diagram showing details of the pre-alarm circuit 20 shown in FIG. 3.

FIG. 4 is a circuit diagram for showing details of the pre-alarm circuit 20 in FIG. 3. In FIG. 4, terminals designated by V+, V− and SGND are respectively connected to an electric power source of an over-current tripping circuit which is not shown in the drawings because of obviousness. $V_{ref}$ is a reference voltage, which is kept, for example, at 4V. Voltage at a terminal designated by $VR_{ref}$ is changeable due to the rated value of the current and set at, for example, 4V when the rated value is 400A and set at 2V when the rated value is 200A. Non-inverted terminal of a first comparator $CM_1$ is connected to a variable resistor $VR_1$ and voltage thereof is changed by the setting of the variable resistor $VR_1$. The variable resistor $VR_1$ is used for setting the pre-alarm level of the value of the current, and co-axially provided on the lug 105a shown in FIG. 1.

A.D.C. signal which is in proportion to the effective value of the current flowing on a main circuit, for example, electric power line 5a, 5b or 5c is applied to a terminal designated by RMST. Namely, signals on the terminal designated by RMST is the output of the effective value circuit 8. When the level of the D.C. signal on the terminal of RMST is above the reference voltage $V_{ref}$ of the first comparator $CM_1$, a switch $Q_1$ is turned off from on state. Non-inverted terminal of a second comparator $CM_2$ is inputted to a reference voltage divided by resistors $R_{12}$ and $R_{13}$. Inverted terminal of the second comparator $CM_2$ is connected to a point $P_1$ which is a connecting point of resistors $R_8$ and $R_{10}$ connected between $V_{ref}$ and SGND in series. A capacitor $C_4$ is connected to the resistor $R_{10}$ in parallel.

At first, as the switch $Q_1$ is turned on state, input of the inverted terminal of the second comparator $CM_2$ is "0". When the switch $Q_1$ turns off, the resistor $R_8$ and the capacitor $C_4$ starts to serve timing operation and the voltage of the capacitor $C_4$ is gradually raised. When the voltage of the capacitor $C_4$ reaches to the reference voltage of the second comparator $CM_2$, a switch $Q_2$ connected to the second comparator $CM_2$ turns on and a current becomes to flow on the photo-coupler 27 via resistor $R_{17}$. As a result, a signal is output to the pre-alarm output circuit 21.

Figure 5:
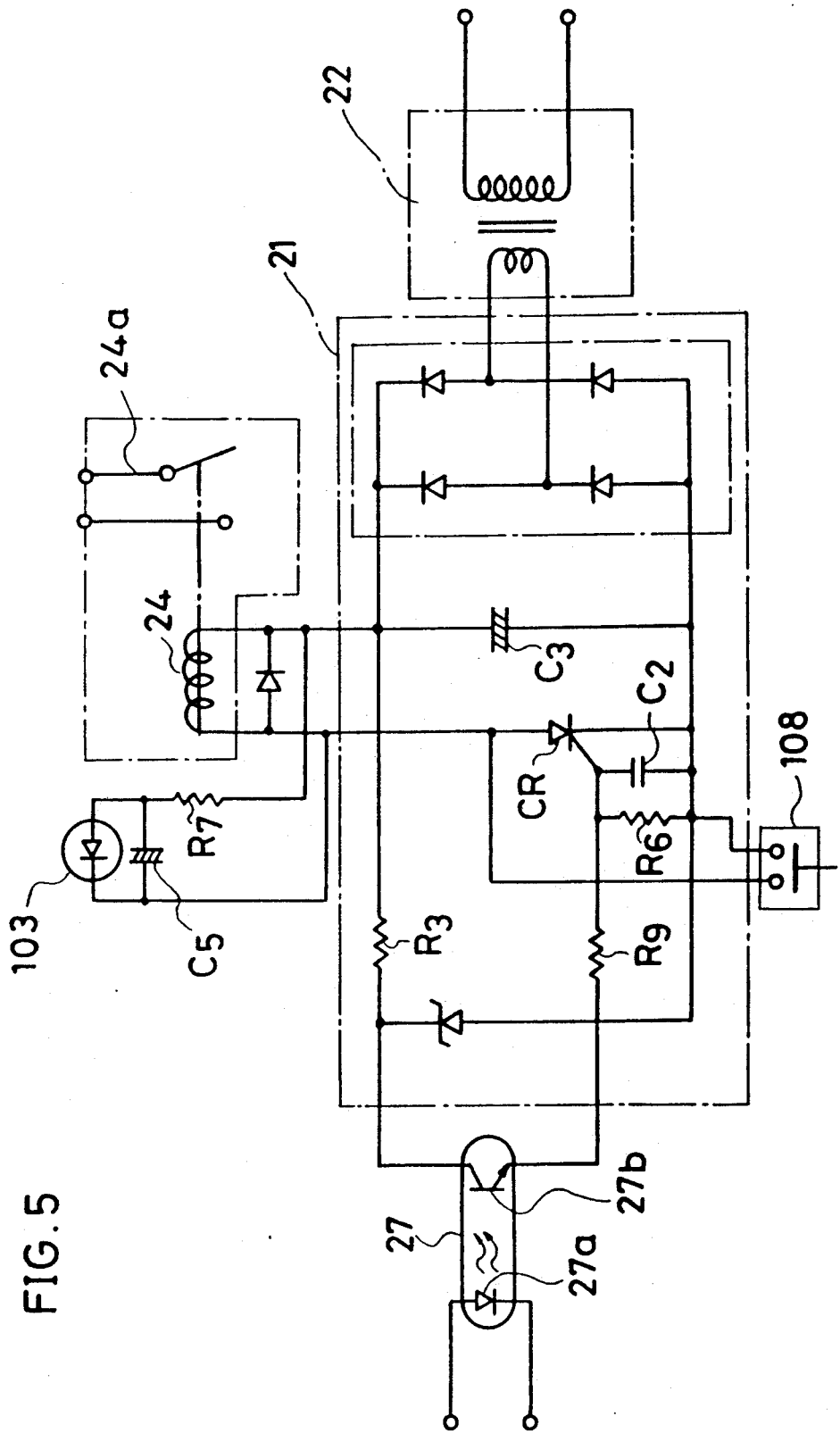
FIG. 5 is a circuit diagram showing details of a pre-alarm output circuit 21 shown in FIG. 3.

FIG. 5 is a circuit diagram showing details of the pre-alarm output circuit 21. In FIG. 5, when LED 27a is lighted by flow of output signal from the pre-alarm circuit 20, photo-transistor 27b of the photo-coupler 27 turns on. When the photo-transistor 27b turns on, current flows to gate of thyristor CR via resistor $R_3$, transistor 27b and resistor $R_9$. When the thyristor CR turns on, current flows on the relay coil 24 and switch 24a is turned on by electro-magnetic force of the relay coil 24. Since the alarm buzzer 26 is connected in series to the switch 24a as shown in FIG. 3, when the normal open switch 24a is turned on the alarm buzzer 26 is driven. At the same time, the operation indicator (LED) 103 for pre-alarming is lighted. A smoothing capacitor $C_3$ of FIG. 5 is for smoothing full-wave rectified current and a capacitor $C_5$ is for preventing erroneous lighting of the operation indicator (LED) 103 due to large-over current of the main circuit. The thyristor CR is once turned on, it is never turned off unless being reset by of the reset switch 108 or shutting of of the power source 23. Therefore, the thyristor CR has a self-holding function.

In the above-mentioned embodiment, the output of the pre-alarm output circuit for lighting the operation indicator (LED) 103 is made possible to output the housing 102 of the switch 101 via the cable 110 (FIG. 1). Such cables 110 are used in parallel for connecting the plural switches to the centralized control apparatus 100 which is disposed at a remote centralized control room. Thereby, the operator or user is informed that at least one overcurrent flows on the load on which the switch with pre-alarm means in accordance with the present invention is provided, by alarming of a buzzer 200 of the central control apparatus 100. After that, he rounds the switches 101 . . . and confirms the one lighting the operation indicator (LED) 103 by self-holding function thereof.

In the above-mentioned embodiment, the cables 110 are directly out from the housing 102. However, it is possible to provide output terminals on the outer face of the housing and other cables is connected between the output terminals and the centralized control apparatus. As a operation indicator 103, the LED is used. However, another indicating device can be replaced the LED.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A switch with pre-alarm means, comprising:
   current value measuring means for measuring values of a current supplied to a load across said switch and for outputting a first signal corresponding to a maximum of said current values;
   pre-alarm judging means for comparing said first signal from said current value measuring means with a predetermined reference value and for outputting a second signal when said first signal exceeds said predetermined reference value, said predetermined reference value being less than an immediate tripping value of said switch;

self-holding output means for outputting an output and holding said output at a predetermined level immediately once said second signal is outputted from said pre-alarm judging means, regardless of further output or lack of output of said second signal; and pre-alarm means responsive to said output of said self-holding output means for indicating an occurrence of an abnormal current through said switch.

2. A switch with pre-alarm means in accordance with claim 1, further comprising:

connecting means, connected to a centralized control apparatus disposed at a position remote from said switch, for conducting said output of said self-holding output means to said centralized control apparatus.

3. A switch with pre-alarm means comprising:

at least one current transforming means, provided on at least one electric power line, for outputting an electric current corresponding to a value of current flowing through said electric power line;

at least one maximum value detecting means for detecting a maximum value among values of said electric current from said current transforming means;

pre-alarm judging means for comparing said maximum value of said maximum value detecting means with a predetermined reference value corresponding to a pre-alarm level and for outputting a first signal when said maximum value is above said predetermined reference value, said predetermined reference value being less than an immediate tripping value of said switch;

self-holding output means for outputting an output and holding said output at a predetermined level immediately once said first signal is outputted from said pre-alarm judging means regardless of whether said maximum value remains above said reference value; and pre-alarm means driven by said output of said self-holding output means held at said predetermined level, for indicating an abnormal current in said at least one power line.

4. A switch with pre-alarm means in accordance with claim 3, further comprising:

reset means for resetting said output of said self-holding output means to an initial value.

5. A switch with pre-alarm means in accordance with claim 3, further comprising:

connecting means for interconnecting said self-holding output means and a centralized control means disposed at a position remote from said switch, said centralized control means having at least one alarming means which is driven by said output of said self-holding output means held at said predetermined level and received via said connecting means.

6. A switch with pre-alarm means in accordance with claim 4, further comprising:

connecting means to be connected to centralized control means disposed at a departed position from said switch; and said centralized control means having at least one alarming means which is driven by said output of said self-holding means held at said predetermined level received via said connecting means.

* * * * *

UNITED STATES PATENT AND TRADEMARK OFFICE
CERTIFICATE OF CORRECTION

PATENT NO. : 5,077,629

DATED : December 31, 1991

INVENTOR(S) : Kazuhiro Ishii, et al.

It is certified that error appears in the above-identified patent and that said Letters Patent is hereby corrected as shown below:

Title page: Item (54) should read -- Switch with pre-alarm means--.

Item (73) Assignee should read --Mitsubishi Denki Kabushiki Kaisha--.

Signed and Sealed this

Twenty-third Day of March, 1993

Attest:

STEPHEN G. KUNIN

*Attesting Officer*     Acting Commissioner of Patents and Trademarks